US011225336B2

(12) United States Patent
Hessling-Von Heimendahl et al.

(10) Patent No.: US 11,225,336 B2
(45) Date of Patent: Jan. 18, 2022

(54) COMBINED AIRCRAFT NAVIGATION AND ANTI-COLLISION LIGHT, AND METHOD OF DETERMINING A STATE OF EROSION OF A LENS COVER OF A COMBINED AIRCRAFT NAVIGATION AND ANTI-COLLISION LIGHT

(71) Applicant: Goodrich Lighting Systems GmbH, Lippstadt (DE)

(72) Inventors: Andre Hessling-Von Heimendahl, Koblenz (DE); Robert Trinschek, Hamm (DE); Anil Kumar Jha, Lippstadt (DE); Matthias Krause, Hamm (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 17/077,106

(22) Filed: Oct. 22, 2020

(65) Prior Publication Data
US 2021/0122494 A1    Apr. 29, 2021

(30) Foreign Application Priority Data
Oct. 25, 2019  (EP) .................... 19205358

(51) Int. Cl.
*B64D 47/06*  (2006.01)
*H05B 47/20*  (2020.01)
(Continued)

(52) U.S. Cl.
CPC .............. *B64D 47/06* (2013.01); *F21S 10/06* (2013.01); *G08G 5/04* (2013.01); *H05B 47/105* (2020.01);
(Continued)

(58) Field of Classification Search
CPC ........ B64D 47/02; B64D 47/04; B64D 47/06; H05B 47/105; G08G 5/04
See application file for complete search history.

(56) References Cited

U.S. PATENT DOCUMENTS

| 5,422,716 A | 6/1995 | Dempsey |
| 6,989,768 B2 | 1/2006 | DeMarco et al. |

(Continued)

FOREIGN PATENT DOCUMENTS

| EP | 2960643 A1 | 12/2015 |
| EP | 3073249 A1 | 9/2016 |

(Continued)

OTHER PUBLICATIONS

European Search Report for application No. 19205358.5-1010, dated Apr. 30, 2020, 8 pages.

*Primary Examiner* — Alexander K Garlen
(74) *Attorney, Agent, or Firm* — Cantor Colburn LLP

(57) ABSTRACT

A combined aircraft navigation and anti-collision light, includes: at least one navigation light source and one anti-collision light source; a navigation light sensor, in operation outputting a light detection signal corresponding to an amount of light detected by the navigation light sensor; first and second optical systems, associated with navigation and collision light sources, wherein the first optical system is configured for shaping a navigation light output from light emitted by the at least one navigation light source and is configured for directing stray light from the at least one navigation light source to the navigation light sensor and a second optical system, associated with the at least one anti-collision light source and configured for shaping an anti-collision light output from light emitted by the at least one anti-collision light source; a lens cover, arranged over the light sources and optical systems for passing light therethrough.

18 Claims, 6 Drawing Sheets

(51) Int. Cl.
- *H05B 47/105* (2020.01)
- *F21S 10/06* (2006.01)
- *G08G 5/04* (2006.01)
- *F21Y 115/10* (2016.01)
- *F21W 107/30* (2018.01)
- *B64D 47/04* (2006.01)

(52) U.S. Cl.
CPC ............. *H05B 47/20* (2020.01); *B64D 47/04* (2013.01); *B64D 2203/00* (2013.01); *F21W 2107/30* (2018.01); *F21Y 2115/10* (2016.08)

(56) References Cited

U.S. PATENT DOCUMENTS

| | | |
|---|---|---|
| 7,288,750 B2 | 10/2007 | Ewig et al. |
| 8,773,044 B2 | 7/2014 | Hessling |
| 8,974,097 B2 | 3/2015 | Hessling et al. |
| 9,846,112 B2 | 12/2017 | Jha et al. |
| 10,151,708 B2 | 12/2018 | Hessling-Von Heimendahl et al. |
| 2006/0249663 A1* | 11/2006 | Ewig ...................... B60Q 11/00 250/221 |
| 2008/0093530 A1* | 4/2008 | Hoelen .................. G01J 3/505 250/201.1 |
| 2009/0212709 A1* | 8/2009 | Meijer ................ F21V 23/0457 315/153 |
| 2016/0282283 A1* | 9/2016 | Hessling-Von Heimendahl ......... B64D 45/00 |
| 2016/0341655 A1* | 11/2016 | Jha ......................... H05B 45/58 |
| 2017/0181246 A1* | 6/2017 | Hessling-Von Heimendahl ......... B64D 47/02 |
| 2019/0144132 A1* | 5/2019 | Jha ......................... H05K 1/181 362/470 |
| 2019/0359348 A1* | 11/2019 | Pawliczek ........... F21V 23/0457 |
| 2020/0189766 A1* | 6/2020 | Jha ......................... B64D 47/04 |

FOREIGN PATENT DOCUMENTS

| | | |
|---|---|---|
| EP | 3095641 A1 | 11/2016 |
| EP | 3095709 A1 | 11/2016 |

* cited by examiner

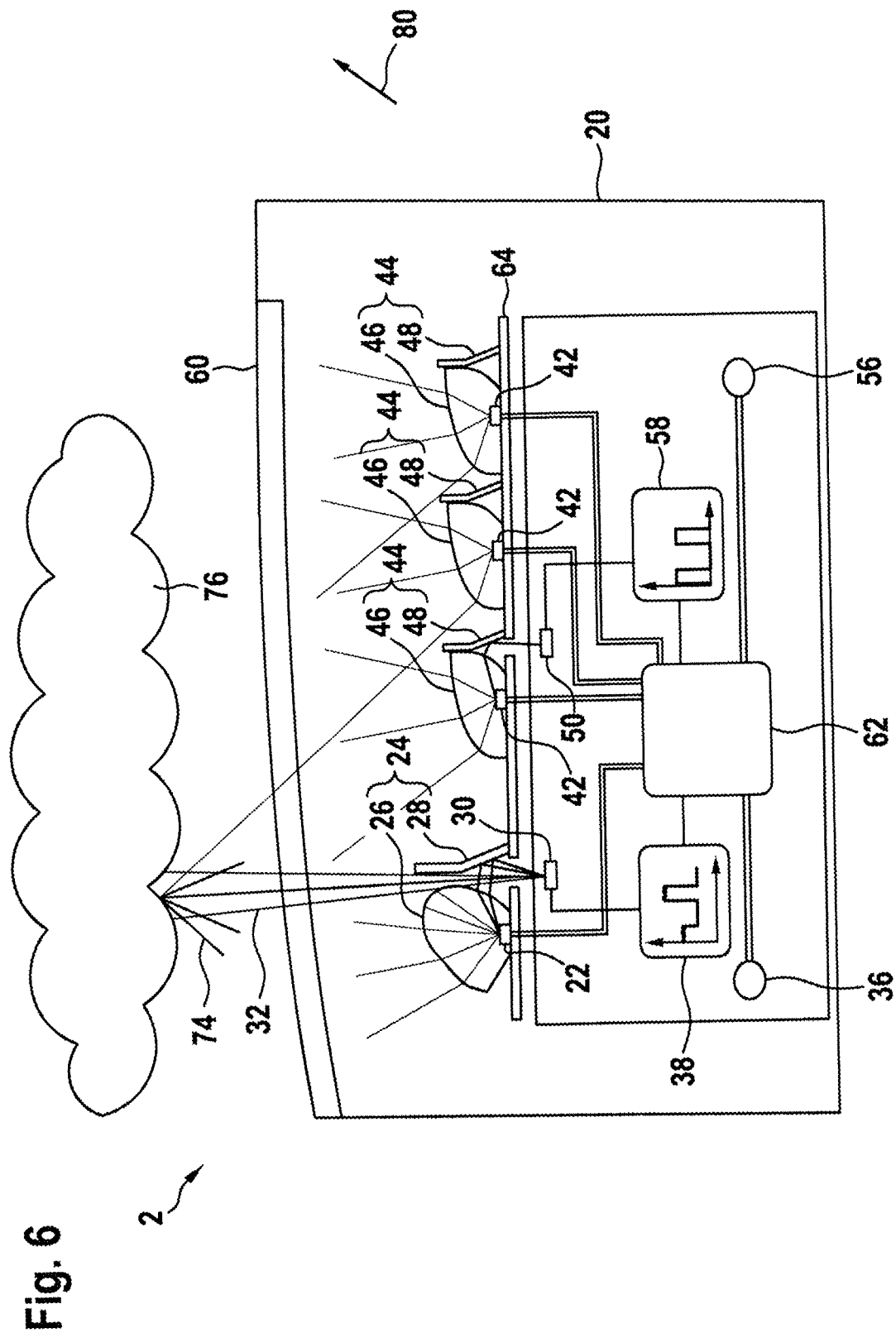

COMBINED AIRCRAFT NAVIGATION AND ANTI-COLLISION LIGHT, AND METHOD OF DETERMINING A STATE OF EROSION OF A LENS COVER OF A COMBINED AIRCRAFT NAVIGATION AND ANTI-COLLISION LIGHT

FOREIGN PRIORITY

This application claims priority to European Patent Application No. 19205358.5 filed Oct. 25, 2019, the entire contents of which is incorporated herein by reference.

TECHNICAL FIELD

The present invention relates to exterior aircraft lighting. In particular, it relates to the maintenance of exterior aircraft lights.

BACKGROUND

Almost all aircraft are equipped with exterior lighting systems. For example, large commercial aircraft have many different exterior lights. An exemplary group of exterior aircraft lights are lights for passive visibility, such as navigation lights, white strobe anti-collision lights, and red-flashing beacon lights. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights.

Exterior aircraft lights work in a highly demanding environment. They are exposed to large temperature variations, high mechanical stresses, and to the airstream with its impinging particles. As a consequence, the covers of exterior aircraft lights, often referred to as lens covers, erode in operation. As a consequence, the light output through the lens cover may become blurry and may even degrade to such an extent that the specifications of the exterior aircraft light are no longer met. Lens covers are therefore frequently replaced in the course of aircraft maintenance.

It would be beneficial to provide an exterior aircraft light that allows for an effective determination of the state of erosion of its lens cover. It would further be beneficial to provide an aircraft equipped with such exterior aircraft light(s). Yet further, it would be beneficial to provide a method for effectively determining a state of erosion of a lens cover.

SUMMARY

Exemplary embodiments of the invention include a combined aircraft navigation and anti-collision light, comprising at least one navigation light source; a navigation light sensor, in operation outputting a light detection signal corresponding to an amount of light detected by the navigation light sensor; a first optical system, associated with the at least one navigation light source, wherein the first optical system is configured for shaping a navigation light output from light emitted by the at least one navigation light source and is configured for directing stray light from the at least one navigation light source to the navigation light sensor; at least one anti-collision light source; a second optical system, associated with the at least one anti-collision light source and configured for shaping an anti-collision light output from light emitted by the at least one anti-collision light source; a lens cover, arranged over the at least one navigation light source, the first optical system, the at least one anti-collision light source, and the second optical system for passing the navigation light output and the anti-collision light output therethrough, wherein the navigation light sensor is arranged with respect to the lens cover to detect light emitted by the at least one anti-collision light source and diffusely reflected by the lens cover; and a controller, coupled to the navigation light sensor and configured to determine a state of erosion of the lens cover from a pulsed signal component of the light detection signal.

Exemplary embodiments of the invention allow for an effective determination of the state of erosion of the lens cover of a combined aircraft navigation and anti-collision light with low complexity and/or no additional components, as compared to combined aircraft navigation and anti-collision lights of previous approaches. The navigation light sensor may be arranged for double use, namely—on the one hand—to monitor the light intensity of the at least one navigation light source, thus monitoring a degradation of the at least one navigation light source over time, and—on the other hand—to monitor the state of erosion of the lens cover via the diffuse reflection of light stemming from the at least one anti-collision light source. As compared to previous approaches of combined aircraft navigation and anti-collision lights, having a near end of life sensor for the at least one navigation light source, no additional sensor hardware is required.

The two different uses of the navigation light sensor may be conveniently implemented via the evaluation of the light detection signal in the controller. With the at least one anti-collision light source being operated in a pulsed manner for achieving the anti-collision light flashes, the controller can distinguish between steady signal components of the light detection signal and pulsed signal components of the light detection signal. The controller can relate the pulsed signal component of the light detection signal to the state of erosion of the lens cover. In particular, the controller can deduce the intensity of diffusely reflected light from the pulsed signal component of the light detection signal and can use said measure for diffuse reflections as a measure for the state of erosion of the lens cover.

With the first optical system directing stray light from the at least one navigation light source to the navigation light sensor, there is an intended light path for monitoring the light intensity of the at least one navigation light source. In addition, the navigation light sensor is arranged with respect to the lens cover in such a way that no Fresnel reflections of light, emitted by the at least one anti-collision light source, can reach the navigation light sensor. Rather, the navigation light sensor is arranged in such a way with respect to the lens cover that light from the at least one anti-collision light source must have undergone a diffuse reflection at the lens cover for reaching the navigation light sensor. With this arrangement, the pulsed signal component of the light detection signal may be considered a good proxy for the state of erosion of the lens cover, and the controller may therefore determine the state of erosion of the lens cover in an effective manner.

The first optical system is configured to direct stray light from the at least one navigation light source to the navigation light sensor. The term stray light refers to light from the at least one navigation light source that is not used for the navigation light output. In particular, the stray light may be light that is emitted into an undesired direction by the at least one navigation light source and that is not directed towards desired directions for the navigation light output by the first optical system. It may therefore be possible to monitor the output light intensity of the at least one navigation light source, without diverting light that is intended for the navigation light output.

The navigation light sensor is arranged with respect to the lens cover to detect light emitted by the at least one anti-collision light source and diffusely reflected by the lens cover. In this way, the navigation light sensor detects light that is intended to contribute to the anti-collision light output, but that is diverted from its intended output path by the lens cover. The diffuse reflection by the lens cover is the result of the erosion of the outer surface of the lens cover, which diverts light rays from its intended path to the lens cover. Given that an eroded outer surface of the lens cover still passes a large portion of light, albeit in a blurred manner, and that the diffuse reflection spreads the reflected light into various directions, only a small portion of the light, output by the at least one anti-collision light source, reaches the navigation light sensor. Given that the anti-collision light output generally has a much higher peak intensity than the navigation light output, the light stemming from the at least one anti-collision light source is still detectable among the light stemming from the at least one navigation light source.

The navigation light sensor is arranged to detect light emitted by the at least one navigation light source and directed towards the navigation light sensor by the first optical system and is arranged to detect light emitted by the at least one anti-collision light source and diffusely reflected by the lens cover. The term to detect light refers to receiving light at a sensor surface of the navigation light sensor. The detection of light may also be referred to as the sensing of light at the navigation light sensor.

The pulsed signal component may comprise a sequence of pulses in the light detection signal. The sequence of pulses may be a regular sequence of pulses, with the pulses having a substantially constant pulse amplitude and/or a substantially constant pulse length and/or a substantially constant pulse frequency. Changes in the sequence of pulses, in particular changes in the amplitude of the pulses, may occur over very long time intervals, as compared to the duration/frequency of the pulses. In particular, significant changes in the amplitude of the pulse signal component may occur in the time frame of months and years.

The first optical system is associated with the at least one navigation light source. The first optical system is arranged and configured to transform the light emission of the at least one navigation light source into the navigation light output. The first optical system may direct a large portion or almost all of the light emitted by the at least one navigation light source towards the lens cover for providing the navigation light output. The navigation light output may satisfy the regulatory demands for aircraft navigation lights, also referred to as aircraft position lights, for the left forward region, the right forward region, or the backwards region. The satisfied regulatory demands may be in line with Federal Aviation Regulations (FAR) sections 25.1385, 25.1387, 25.1389, 25.1391, 25.1393, 25.1395, and 25.1397. The first optical system may comprise one or more lenses and/or one or more reflectors and/or one or more shutters.

The at least one navigation light source may be one navigation light source or may comprise a plurality of navigation light sources. In particular, the at least one navigation light source may consist of exactly two navigation light sources, thus providing inherent redundancy for the case of one of the two navigation light sources failing.

The first optical system may comprise a freeform lens and an integrated shutter and reflector element. The freeform lens may be arranged over the at least one navigation light source, in particular over the two redundant navigation light sources, for shaping the navigation light output from the light emitted by the at least one navigation light source. The integrated reflector and shutter element may, on the one hand, block light from reaching the sectors of other aircraft navigation lights and, on the other hand, efficiently reflect said stray light to the navigation light sensor.

The second optical system is associated with the at least one anti-collision light source. The second optical system is arranged and configured to transform the light emitted by the at least one anti-collision light source into the anti-collision light output. The anti-collision light output satisfies regulatory demands for aircraft anti-collision lights. The anti-collision light output may satisfy the regulatory demands for aircraft anti-collision lights, in particular for white strobe anti-collision lights and/or red flashing beacon lights, for a given angular sector in the horizontal plane. The regulatory demands may be in accordance with Federal Aviation Regulations (FAR) section 25.1401.

The at least one anti-collision light source may be a plurality of anti-collision light sources. The second optical system may have a plurality of second optical sub-systems, with each of the plurality of second optical sub-systems being associated with one of the plurality of anti-collision light sources. The second optical system may comprise one or more lenses and/or one or more reflectors and/or one or more shutters. Also, each of the plurality of second optical sub-systems may comprise one or more lenses and/or one or more reflectors and/or one or more shutters. In a particular embodiment, each of the plurality of second optical sub-systems provides a light output that, when multiplied by the number of anti-collision light sources and second optical sub-systems, satisfies the regulatory demands for aircraft anti-collision lights for a given angular sector.

While the option of providing a plurality of anti-collision light sources and a plurality of second optical sub-systems has been described, it is pointed out that it is also possible that there is one anti-collision light source and a singular second optical system or that there a plurality of anti-collision light sources and a singular second optical system for reaching the anti-collision light output. The second optical system or the plurality of second optical sub-systems may comprise a shutter/a plurality of shutters for blocking undesired light directions. Further, one of the shutters or all of the shutters may be integrated with a reflector section for directing light to an anti-collision light sensor, as will be described in more detail below.

According to a further embodiment, the at least one navigation light source is at least one navigation LED. With LEDs being compact, reliable, and power efficient light sources, an overall compact, reliable, and power efficient combined aircraft navigation and anti-collision light may be achieved.

According to a further embodiment, the at least one anti-collision light source is at least one anti-collision LED. With LEDs being compact, reliable, and power efficient light sources, an overall compact, reliable, and power efficient combined aircraft navigation and anti-collision light may be achieved.

According to a further embodiment, the anti-collision light output has a peak light intensity that is at least 10 times the peak light intensity of the navigation light output. In particular, the anti-collision light output has a peak light intensity that is between 10 times and 30 times, in particular between 15 times and 20 times, the peak light intensity of the navigation light output.

According to a further embodiment, the navigation light sensor is arranged in line of sight to the lens cover. In this way, an unobstructed path to the navigation light sensor exists for the light, stemming from the at least one anti-collision light source and diffusely reflected by the lens cover. In particular, the arrangement may be such that no optical elements temper with detecting said diffuse reflection by the lens cover. The feature of the navigation light sensor being arranged in line of sight to the lens cover means that there is at least one line that connects the navigation light sensor and the lens cover, without hitting or running through any optical elements.

According to a further embodiment, the navigation light sensor has a field of view of at least 5° opening angle, in particular of at least 10° opening angle, further in particular of between 10° and 45°, yet further in particular of between 10° and 20° opening angle, through the lens cover. In this way, there is an extended portion of the lens cover from where diffuse reflections at the lens cover are able to reach the navigation light sensor. In this way, the state of erosion of the lens cover can be determined in a particularly reliable manner.

According to a further embodiment, the controller is configured to determine the state of erosion of the lens cover from a pulsed signal component of the light detection signal having a pulse frequency of between 40 and 100 pulses per minute. The controller may detect/extract a regular pulsed signal component in the light detection signal with a pulse frequency of between 40 and 100 pulses per minute and may determine the state of erosion therefrom. With aircraft anti-collision lights generally operating at a frequency of between 40 and 100 pulses per minute, detecting such a pulsed signal component has a very high likelihood of detecting the light originally stemming from the at least one anti-collision light source and being diffusely reflected by the lens cover.

According to a further embodiment, the controller is configured to determine the state of erosion of the lens cover from a pulsed signal component of the light detection signal having a pulse frequency corresponding to the flash frequency of the at least one anti-collision light source. The flash frequency of the at least one anti-collision light source may be known a priori to the controller or may be communicated to the controller or may be deduced by the controller from an anti-collision light source command line. It is also possible that the controller in operation controls the at least one anti-collision light source. In this case, the controller inherently has the information about the flash frequency of the at least one anti-collision light source.

According to a further embodiment, the controller is configured to determine the state of erosion of the lens cover from a pulsed signal component of the light detection signal having a substantially constant pulse amplitude. With the interval between pulses of the pulsed signal component being much shorter than significant changes in the erosion of the lens cover, there is a high likelihood that a pulsed signal component with a substantially constant pulse amplitude is due to light stemming from the at least one anti-collision light source and being diffusely reflected at the lens cover. Accordingly, detecting a pulsed signal component with a substantially constant pulse amplitude and evaluating said pulsed signal component has a high likelihood of yielding a good measure for the state of erosion of the lens cover.

According to a further embodiment, the controller is configured to indicate a critical state of erosion of the lens cover when a pulse amplitude of the pulsed signal component exceeds a pulse amplitude threshold. The pulse amplitude threshold may be a predetermined amplitude threshold or may be an amplitude threshold, normalized to the intensity of the anti-collision light output as momentarily emitted by the combined aircraft navigation and anti-collision light. The controller may indicate the critical state in a visual manner, e.g. via the illumination of a suitable signalling light source. It is also possible that the controller communicates such information to the aircraft on-board computer and/or to the pilots in the cockpit and/or to the crew via a suitable communication terminal. It is further possible that the controller stores such indication in a local memory for being read out during maintenance of the aircraft.

According to a further embodiment, the controller is configured to determinate the state of degradation of the at least one navigation light source from a steady signal component of the light detection signal. With the navigation light output being continuously emitted by the combined aircraft navigation and anti-collision light and with stray light from the at least one navigation light source being directed to the navigation light sensor, the steady signal component of the light detection signal is a good indicator of the momentary performance of the at least one navigation light source. A decline of the steady signal component or a falling of the amplitude of the steady signal component below a predetermined threshold may be a good indicator for the degradation of the at least one navigation light source.

According to a further embodiment, the controller is configured to dim the at least one navigation light source and/or the at least one anti-collision light source in response to detecting a non-regular pulsed signal component in the light detection signal. The non-regular pulsed signal component may be a good indicator for clouds and/or fog and/or haze and/or rain, through which the aircraft is flying. All of clouds, fog, haze, and rain produce varying reflections of light, stemming from the at least one anti-collision light source. The varying reflections may lead to variations in the light detection signal, which may be described as non-regular pulses in the light detection signal. In order to reduce reflections in the clouds/fog/haze/rain that may disturb the pilots of the aircraft, the controller may be configured to dim the at least one navigation light source and/or the at least one anti-collision light source. In particular, the controller may be configured to dim the at least one navigation light source and/or the at least one anti-collision light source to a minimum level that is required by regulations and/or mandated by other safety considerations.

According to a further embodiment, the combined aircraft navigation and anti-collision light further comprises an anti-collision light sensor, in operation outputting a second light detection signal corresponding to an amount of light detected by the anti-collision light sensor, wherein the second optical system is configured for directing stray light from the at least one anti-collision light source to the anti-collision light sensor. In this way, the combined aircraft navigation and anti-collision light may also monitor the performance/degradation of the at least one anti-collision light source. In a particular embodiment, the controller is coupled to the anti-collision light sensor and is configured to determine a state of degradation of the at least one anti-collision light source from an amplitude of the second light detection signal.

According to a further embodiment, the controller is coupled to the anti-collision light sensor and is configured to determine a characteristic pulse frequency and/or a characteristic pulse duration from the second light detection signal. The controller may further be configured to extract said pulsed signal component from the light detection signal on the basis of the characteristic pulse frequency and/or the characteristic pulse duration. In this way, the controller may detect the pulsed signal component, containing the information about the state of erosion of the lens cover, from the light detection signal in a targeted manner. On the basis of the characteristic pulse frequency and/or the characteristic pulse duration of the light emission of the at least one anti-collision light source, the reliability of the determination of the state of erosion may be increased. As described above, it is also possible that the controller has the information about the characteristic pulse frequency and/or the characteristic pulse duration from other sources, such that a determination thereof can be omitted.

According to a further embodiment, the at least one navigation light source and the at least one anti-collision light source are arranged substantially on a common mounting plane. The common mounting plane is understood as a geometric plane. In an implementation, the at least one navigation light source and the at least one anti-collision light source may be arranged on a circuit board, such as a printed circuit board, or on two separate circuit boards, such as two separate printed circuit boards, which are substantially aligned. The terminology of the at least one navigation light source and the at least one anti-collision light source being arranged substantially on the common mounting plane encompasses slight deviations of the mounting positions of the light sources from the common mounting plane. For example, particular light source(s) may be elevated over the common mounting plane or may be recessed, as compared to the common mounting plane. In a particular embodiment, the first optical system and/or the second optical system are also arranged on the common mounting plane. In particular, the first optical system and/or the second optical system may be arranged over the at least one navigation light source and the at least one anti-collision light source and may be fastened to the one or more circuit boards supporting the light sources.

According to a further embodiment, the at least one navigation light source and the at least one anti-collision light source are spaced between 5 cm and 20 cm, in particular between 5 cm and 10 cm, from the lens cover. In this way, the geometric relations between the at least one anti-collision light source, the lens cover, and the navigation light sensor allow for a set-up that enables a significant amount of diffusely reflected light from the lens cover to be received by the navigation light sensor. This in turn allows for a particularly reliable determination of the state of erosion of the lens cover.

Exemplary embodiments of the invention further include an aircraft comprising at least on combined aircraft navigation and anti-collision light, as described in any of the embodiments above. The additional features, modifications and effects, as described above with respect to the combined aircraft navigation and anti-collision light, apply to the aircraft in an analagous manner.

According to a further embodiment, the aircraft is an air plane, and the air plane has a left combined aircraft navigation and anti-collision light, as described in any of the embodiments above, arranged in a wing tip region of the left wing of the air plane, and a right combined aircraft navigation and anti-collision light, as described in any of the embodiments above, arranged in a wing tip region of the right wing of the air plane. Combined aircraft navigation and anti-collision lights in the wing tip regions of the wings of an air plane are particularly susceptible to erosion, as the lens covers are directly exposed to the air stream and the particles contained therein. The effective determination of the state of erosion of the lens cover is therefore particularly beneficial for combined aircraft navigation and anti-collision lights, arranged in wing tip regions of the air plane.

Exemplary embodiments of the invention further include a method of determining a state of erosion of a lens cover of a combined aircraft navigation and anti-collision light, having at least one navigation light source and at least one anti-collision light source, the method comprising: generating a light detection signal with a navigation light sensor, the light detection signal corresponding to an amount of light detected by the navigation light sensor, wherein the navigation light sensor is arranged to detect stray light from the at least one navigation light source, directed towards the navigation light sensor by a first optical system, and wherein the navigation light sensor is arranged to detect light emitted by the at least one anti-collision light source and diffusely reflected by the lens cover; and determining a state of erosion of the lens cover from a pulsed signal component of the light detection signal. The additional features, modifications and effects, as described above with respect to the combined aircraft navigation and anti-collision light, apply to the method of determining a state of erosion of the lens cover of the combined aircraft navigation and anti-collision light in an analagous manner.

According to a further embodiment, the method comprises outputting an indication of the state of erosion of the lens cover and/or storing an indication of the state of erosion of the lens cover in the combined aircraft navigation and anti-collision light. In this way, the state of erosion may be conveyed to ground personnel and/or pilots during inspection of the aircraft and/or to maintenance personnel and/or maintenance programs.

According to a further embodiment, the step of determining a state of erosion of the lens cover comprises determining the state of erosion of the lens cover from a pulsed signal component of the light detection signal having a pulse frequency of between 40 and 100 pulses per minute.

According to a further embodiment, the step of determining a state of erosion of the lens cover comprises determining the state of erosion of the lens cover from a pulsed signal component of the light detection signal having a substantially constant pulse amplitude.

BRIEF DESCRIPTION OF THE DRAWINGS

Further exemplary embodiments of the invention will be described below with respect to the accompanying drawings, wherein:

FIG. 6 shows the combined aircraft navigation and anti-collision light of FIG. 4, when flying through clouds.

DETAILED DESCRIPTION

Figure 1:
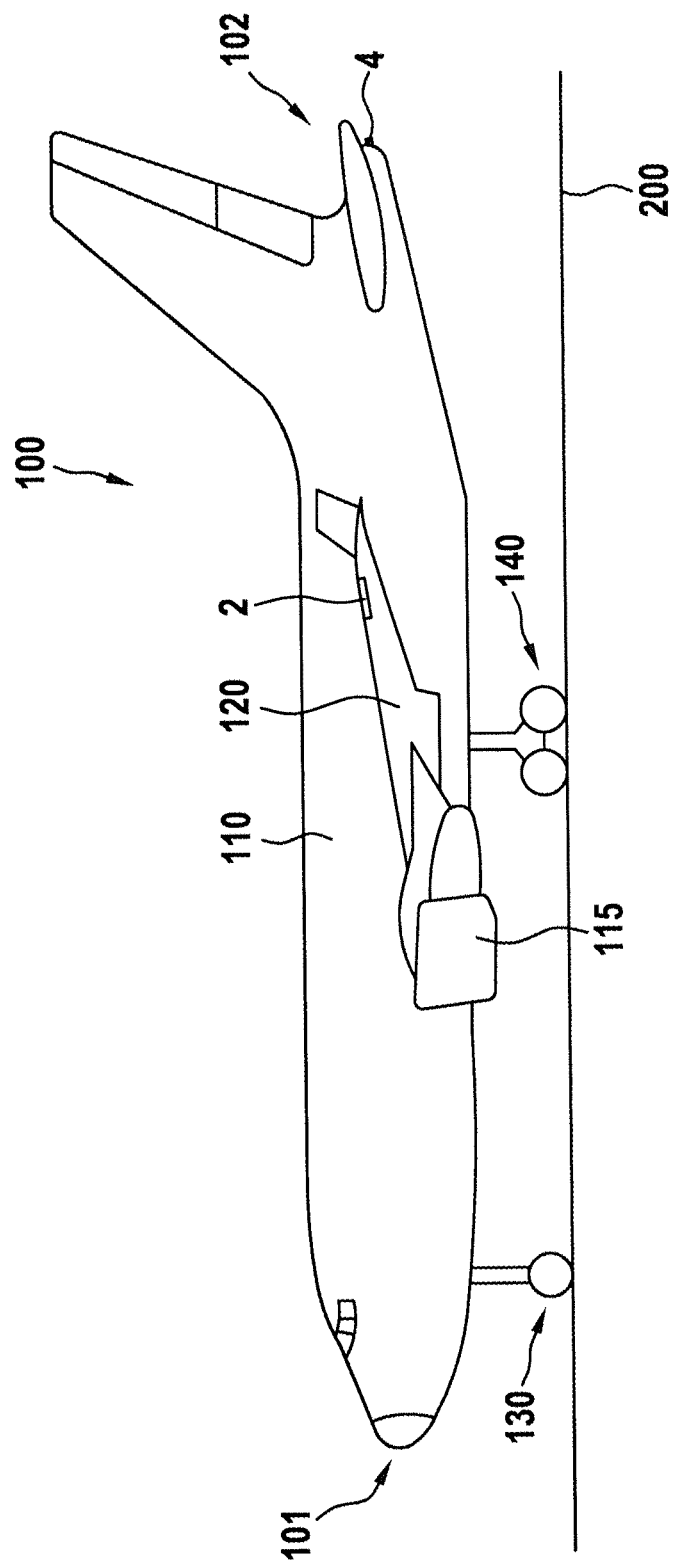
FIG. 1 shows a schematic side view of an aircraft in accordance with an exemplary embodiment of the invention, the aircraft being equipped with combined aircraft navigation and anti-collision lights in accordance with exemplary embodiments of the invention.
Figure 2:
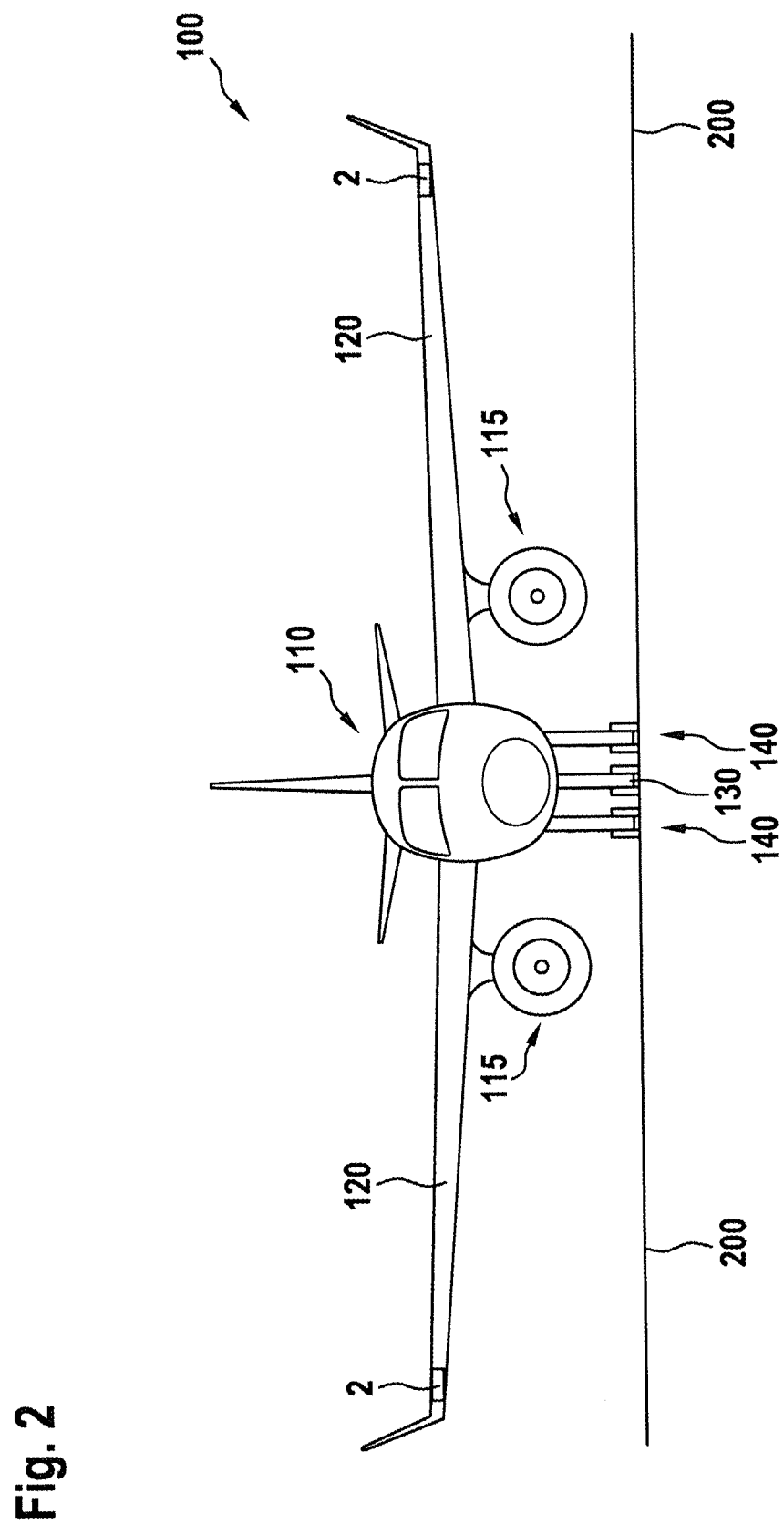
FIG. 2 shows a schematic front view of the aircraft depicted in FIG. 1.

FIG. 1 shows a schematic side view of an aircraft 100 in accordance with an exemplary embodiment of the invention. In the exemplary embodiment of FIG. 1, the aircraft is a large commercial passenger air plane. FIG. 2 shows a schematic front view of the aircraft 100, depicted in FIG. 1.

The aircraft 100, depicted in FIGS. 1 and 2, is resting on a ground 200, such as a runway, a taxi way, an airport ramp, or a ground portion next to a gate. The aircraft 100 has a fuselage 110, extending from a tip 101 of the aircraft to a tail 102 of the aircraft, two wings 120, extending laterally from the fuselage 110, a front gear 130 and two main gears 140. Each of the left and right wings 120 supports an engine 115. Only the left one of the wings 120, the engines 115 and the main gears 140 is visible in the side view of FIG. 1.

The aircraft 100 is equipped with two forward combined aircraft navigation and anti-collision lights 2 and a tail combined aircraft navigation and anti-collision light 4. In particular, the aircraft 100 has a left combined aircraft navigation and anti-collision light 2, arranged in a wing tip region of the left wing 120 of the aircraft 100, and a right combined aircraft navigation and anti-collision light 2, arranged in a wing tip region of the right wing 120 of the aircraft 100. In the exemplary embodiment of FIGS. 1 and 2, each of the left and right combined aircraft navigation and anti-collision lights 2 is embodied in accordance with an exemplary embodiment of the invention. The details of combined aircraft navigation and anti-collision lights in accordance with exemplary embodiments of the invention will be described below with respect to FIGS. 3-6.

The tail combined aircraft navigation and anti-collision light 4 is arranged at a tail 102 of the aircraft. The tail combined aircraft navigation and anti-collision light 4 may or may not be embodied in accordance with an exemplary embodiment of the invention. As the impinging airstream does not hit the tail combined aircraft navigation and anti-collision light 4 head on, the issue of erosion of the lens cover may be less prominent. However, other factors, such as the exhaust of an auxiliary power unit arranged at the tail of the aircraft, may also contribute to the erosion of the lens cover of the tail combined aircraft navigation and anti-collision light 4. Embodying the tail combined aircraft navigation and anti-collision light 4 in accordance with an exemplary embodiment of the invention is explicitly disclosed herewith.

Figure 3:
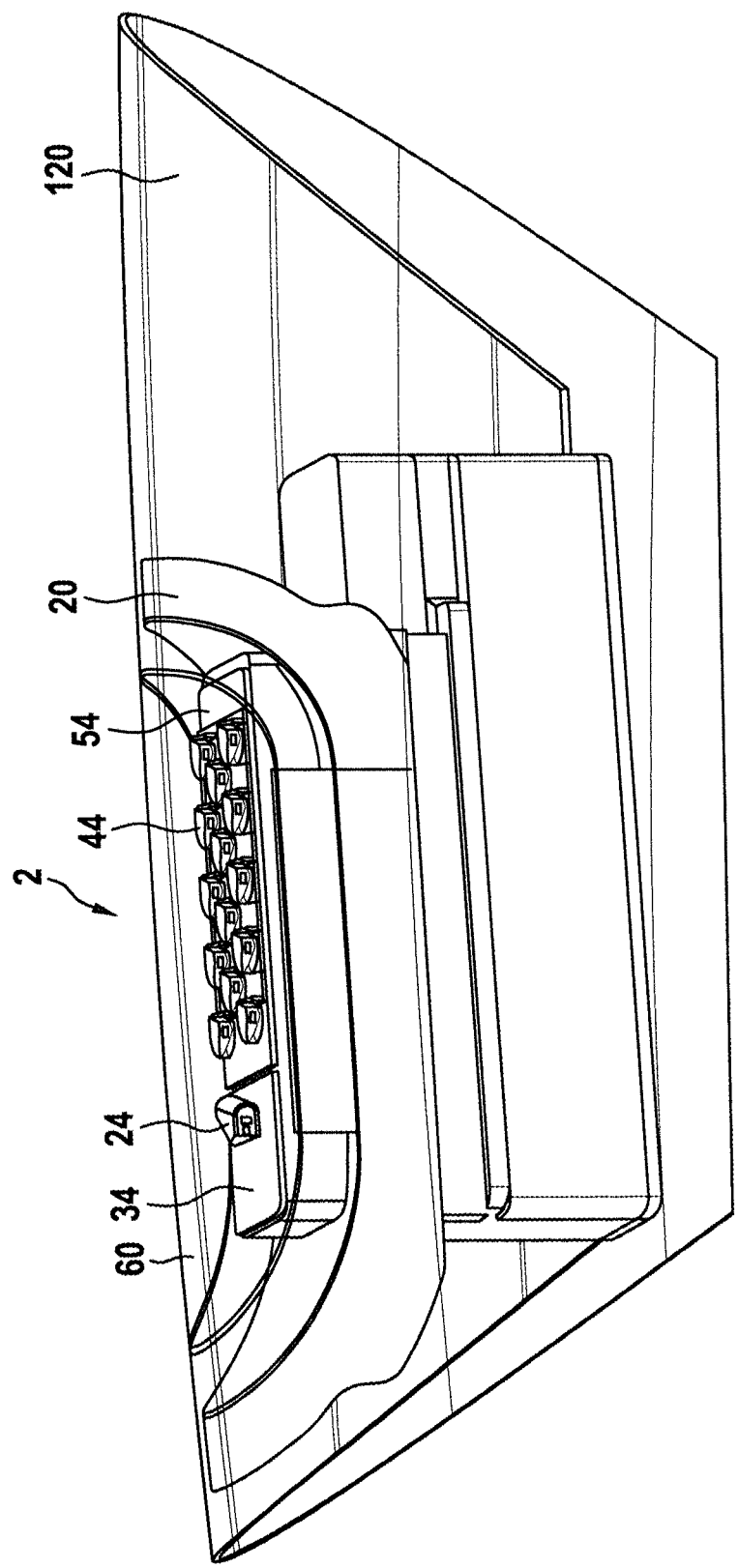
FIG. 3 shows a schematic perspective view of a portion of a left wing tip region of an aircraft, with a combined aircraft navigation and anti-collision light in accordance with an exemplary embodiment of the invention being installed in the depicted left wing tip region.

FIG. 3 shows a schematic perspective top view of a portion of the wing tip region of the left wing 120 of an aircraft in accordance with an exemplary embodiment of the invention. The front edge of the wing 120 is depicted towards the top in the drawing plane of FIG. 3. The depicted portion of the left wing 120 is towards the inside of the upwards bent wing tip, i.e. in the more or less horizontal part of the left wing 120.

A combined aircraft navigation and anti-collision light 2 in accordance with an exemplary embodiment of the invention is installed in the depicted portion of the wing 120. In the exemplary embodiment of FIG. 3, the combined aircraft navigation and anti-collision light 2 is a combined aircraft navigation and white strobe anti-collision light. Instead of/in addition to the white strobe anti-collision lighting functionality, the combined aircraft navigation and anti-collision light may also have red beacon anti-collision lighting functionality.

The combined aircraft navigation and anti-collision light 2 has a housing 20 which is arranged to the inside of the skin of the wing 120. The combined aircraft navigation and anti-collision light 2 further comprises a navigation light circuit board 34, to which at least one navigation light source is mounted. A first optical system 24, which is a combination of a lens and an integrated shutter and reflector element in the exemplary embodiment of FIG. 3, is supported by the navigation light circuit board 34 and arranged over the at least one navigation light source for shaping the navigation light output. The combined aircraft navigation and anti-collision light 2 further comprises an anti-collision light circuit board 54, which supports fourteen combinations of an anti-collision light source and an associated second optical sub-system 44 for shaping the anti-collision light output. The fourteen anti-collision light sources jointly provide a high intensity flashing white anti-collision light output in the exemplary embodiment of FIG. 3. Each of the fourteen second optical sub-systems 44 is a combination of a lens and a shutter element in the exemplary embodiment of FIG. 3. For one of the second optical sub-systems 44, the shutter element may have a reflective portion, as will be described below with respect to FIG. 4.

The combined aircraft navigation and anti-collision light 2 further comprises a lens cover 60 for closing the combined aircraft navigation and anti-collision light 2 with respect to the environment of the aircraft. The navigation light circuit board 34 and the anti-collision light circuit board 54 are arranged between the housing 20 and the lens cover 60, in particular mounted to the housing 20 via a suitable console. During operation of the aircraft, the lens cover 60 is directly exposed to the impinging air stream and the particles contained therein. Erosion of the lens cover 60 occurs during operation of the aircraft, in particular at and around that portion of the lens cover that runs along the front edge of the wing 120.

Figure 4:
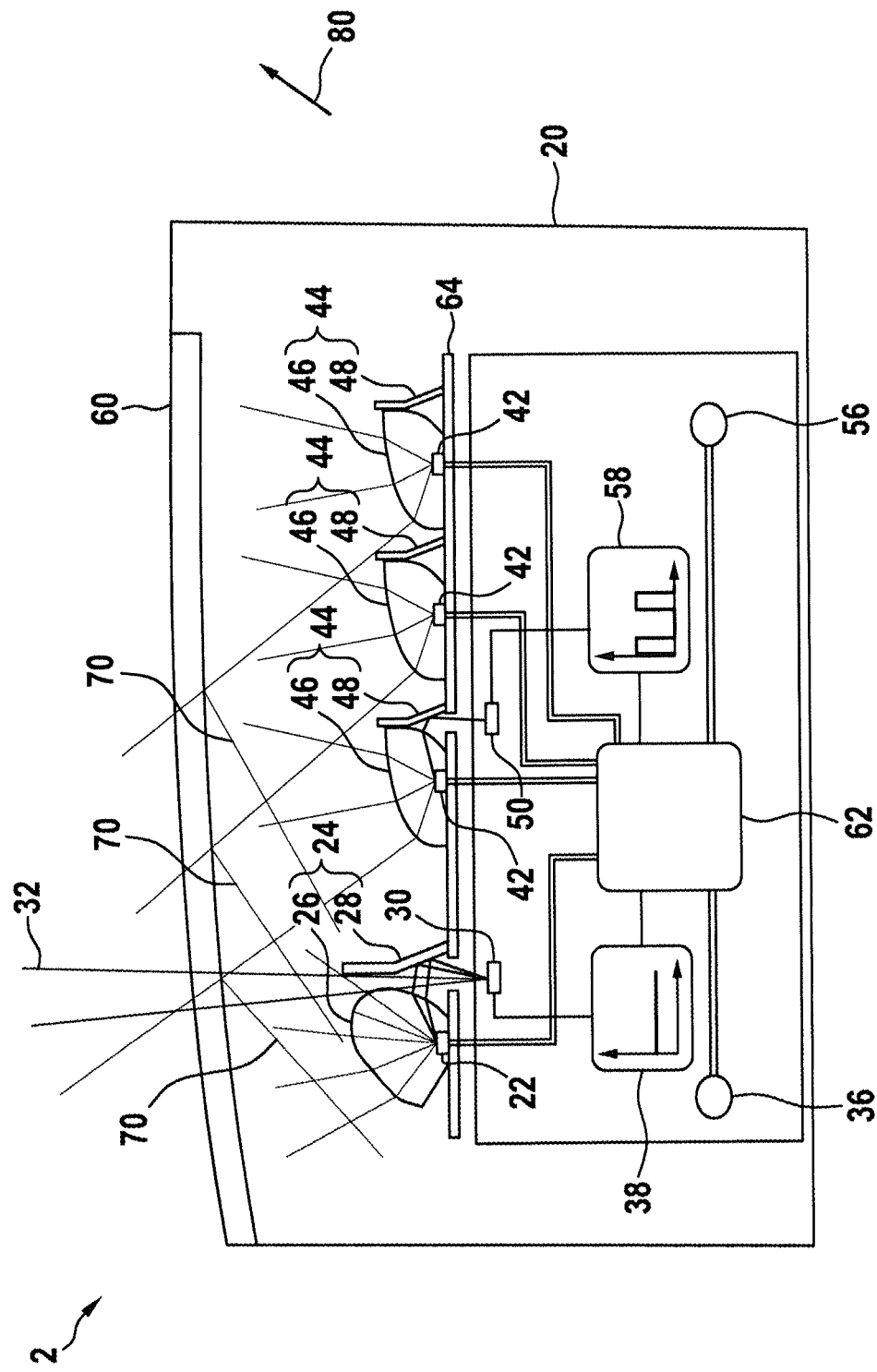
FIG. 4 shows a combined aircraft navigation and anti-collision light in accordance with an exemplary embodiment of the invention, having a non-eroded lens cover, depicted partly in a schematic cross-sectional view and partly in a block diagram.

FIG. 4 shows a combined aircraft navigation and anti-collision light 2 in accordance with an exemplary embodiment of the invention, depicted partly in a schematic cross-sectional view and partly in a block diagram. The combined aircraft navigation and anti-collision light 2 of FIG. 4 is a left combined aircraft navigation and anti-collision light, arranged in a wing tip region of the left wing of an aircraft. The cross-sectional plane of FIG. 4 is a horizontal cross-sectional plane. The flight direction is indicated with reference numeral 80. As the combined aircraft navigation and anti-collision light 2 of FIG. 4 is embedded into the aerodynamic skin of the left wing of the aircraft, the flight direction 80 indicates that the combined aircraft navigation and anti-collision light 2 is arranged in a portion of the wing of the aircraft whose aerodynamic front edge is oriented obliquely with respect to the flight direction 80.

The combined aircraft navigation and anti-collision light 2 comprises a housing 20 and a lens cover 60. The housing 20 and the lens cover 60 provide an inner space for the optical components of the combined aircraft navigation and anti-collision light 2. The depicted horizontal cross-sectional plane of FIG. 4 cuts through the lens cover 60 at or near the aerodynamic front edge of the wing of the aircraft. Hence, the outer surface of the lens cover 60 is very prone to erosion due to the impinging air stream and the particles contained therein.

The combined aircraft navigation and anti-collision light 2 of FIG. 4 comprises a circuit board 64, in particular a printed circular board 64, to which a navigation light source 22, a first optical system 24, a plurality of anti-collision light sources 42, and a plurality of second optical sub-systems 44 are mounted. The circuit board 64, the navigation light source 22, the first optical system 24, the plurality of anti-collision light sources 42, and the plurality of second optical sub-systems 44 are shown in a schematic cross-sectional view. The plurality of second optical sub-systems 44 jointly form the second optical system of the combined aircraft navigation and the anti-collision light 2. While three anti-collision light sources 42 and three second optical sub-systems 44 are shown in FIG. 4 for illustrative purposes, it is understood that a smaller or larger number of anti-collision light sources 42 and second optical sub-systems 44 may be present. The navigation light source 22 and the anti-collision light sources 42 are a navigation LED and anti-collision LEDs in the exemplary embodiment of FIG. 4.

The navigation light source 22 and the first optical system 24 jointly generate a navigation light output of the combined aircraft navigation and anti-collision light 2. The first optical system 24 comprises a lens 26 and an integrated shutter and reflector element 28. In operation, the navigation light source 22 emits red light, thus achieving a red left forward navigation light output. The lens 26 refracts the light emission from the navigation light source 22 and distributes the light emission in a way to fulfil the requirements for aircraft navigation lights, for example the requirements specified in the Federal Aviation Regulations (FAR). The integrated shutter and reflector element 28 ensures that none or only a very small portion of the red light from the navigation light source 22 is emitted towards the right of the flight direction 80, i.e. to the "wrong" side of the aircraft in terms of aircraft navigation lighting. The navigation light output is illustrated by some exemplary light rays in FIG. 4.

The plurality of anti-collision light sources 42 and the plurality of second optical sub-systems 44 jointly generate the anti-collision light output of the combined aircraft navigation and anti-collision light 2. Each of the second optical sub-systems 44 comprises a lens 46 and a shutter element 48. The anti-collision light sources 42 emit white light, and the lenses 46 refract said light and re-distribute the light. In particular, the lenses 46 re-distribute the light of the anti-collision light sources 42 in such a way that the overall light output, as provided by the plurality of anti-collision light sources 42 and the second optical sub-systems 44, satisfies the requirements for aircraft anti-collision lights, as for example laid out by the Federal Aviation Regulations (FAR). In particular, the anti-collision light output of the combined aircraft navigation and anti-collision light 2 may satisfy said regulations over a horizontal angular sector of at least 110°. The anti-collision light output is illustrated by some exemplary light rays in FIG. 4.

The shutter elements 48 may provide a border of the anti-collision light output vs. the anti-collision light output of a symmetric combined aircraft navigation and anti-collision light on the right wing of the aircraft, in order to avoid undesired flashing patterns in in overlap region in the case of the lights being erroneously out of sync. In operation, the anti-collision light sources 42 emit respective sequences of white light flashes, such that the anti-collision light output is a white strobe anti-collision light output.

The combined aircraft navigation and anti-collision light 2 of FIG. 4 further comprises a navigation light sensor 30 and an anti-collision light sensor 50. The navigation light sensor 30 and the anti-collision light sensor 50 are arranged on the backside of the circuit board 64, facing respective openings in the circuit board 64. The integrated shutter and reflector element 28 of the first optical system 24 directs stray light from the navigation light source 22 towards the navigation light sensor 30. This is illustrated by two exemplary light rays in FIG. 4. One of the shutter elements 48 of the second optical sub-systems 44 is also at least partly reflective and directs stray light from one of the anti-collision light sources 42 to the anti-collision light sensor 50. This is illustrated by an exemplary light ray in FIG. 4. It is pointed out that the relative positioning of the navigation light source 22/the anti-collision light sources 42 and the navigation light sensor 30/the anti-collision light sensor 50 is exemplary only. Other arrangements are also possible, as long as the directing of light from the light sources to the light sensors is established.

The navigation light sensor 30 and the anti-collision light sensor 50 serve the first purpose of monitoring the performance of the navigation light source 22 and the anti-collision light sources 42, respectively. The navigation light sensor 30 generates a first light detection signal, corresponding to the amount of light detected by the navigation light sensor 30, and outputs said first light detection signal to a controller 62. The anti-collision light sensor 50 generates a second light detection signal, corresponding to the amount of light detected by the anti-collision light sensor 50, and outputs said second light detection signal to the controller 62.

The controller 62 receives the first light detection signal from the navigation light sensor 30 and the second light detection signal from the anti-collision light sensor 50 and determines a state of degradation of the navigation light source 22/of the plurality of anti-collision light sources 42, respectively. In particular, the controller 62 may determine if the amount of light detected by the navigation light sensor and/or the anti-collision light sensor falls below a respective predetermined threshold, indicating a critical degradation of the navigation light source 22/of the anti-collision light sources 42.

The combined aircraft navigation and anti-collision light 2 of FIG. 4 further comprises a first near end of life (NEOL) indicator light source 36 and a second NEOL indicator light source 56. Upon detecting that the navigation light source 22 has degraded to a critical degree, the controller illuminates the first NEOL indicator light source 36, thus indicating a NEOL condition of the navigation light source 22 to ground personnel/pilots inspecting the aircraft. In case the controller 62 detects that the plurality of anti-collision light sources have degraded to a critical degree, the controller illuminates the second NEOL indicator light source 56, thus indicating a NEOL condition of the plurality of anti-collision light sources 42 to ground personnel/pilots inspecting the aircraft. The first NEOL indicator light source 36 and the second NEOL indicator light source 56 are LEDs, in particular yellow LEDs, in the exemplary embodiment of FIG. 4. It is pointed out that the monitoring of a single anti-collision light source 42 is considered sufficient for making a determination about the performance of the plurality of anti-collision light sources 42, because the anti-collision light sources 42 are exposed to similar operating conditions in terms of operating current and operating temperature. It is also possible that further anti-collision light sensors are provided for receiving stray light from one or more or all of the other anti-collision light sources 42.

In FIG. 4, exemplary courses over time of the first light detection signal and the second light detection signal are illustrated in boxes 38 and 58. The first light detection signal is therefore also indicated with reference numeral 38 herein, and the second light detection signal is also indicated with reference numeral 58 herein.

The controller 62, the first NEOL indicator light source 36, and the second NEOL indicator light source 56 are shown in the block diagram portion of FIG. 4. They may be arranged at any suitable location in the combined aircraft navigation and anti-collision light 2, such as on the circuit board 64.

In the exemplary embodiment of FIG. 4, the controller 62 also controls the navigation light source 22 and the plurality of anti-collision light sources 42. It is also possible that a separate controller controls the navigation light source 22 and the plurality of anti-collision light sources 42 and that the controller 62 is provided for monitoring the light sources and the state of erosion of the lens cover 60 only.

FIG. 4 assumes an operating scenario where the lens cover is un-eroded, where there is no direct impact of sunlight onto the navigation light sensor 30, and where the sky, through which the aircraft is flying, is clear. In this case, the first light detection signal 38 substantially only has a steady signal component, which is constant over time and which is more or less entirely due to the stray light from the navigation light source 22 being directed towards the navigation light sensor 30. The second light detection signal 58 substantially only has a pulsed signal component that is due to the stray light from the anti-collision light source 42 being directed towards the anti-collision light sensor 50. The pulsed signal component of the second light detection signal 58 reflects the flashing operation of the plurality of anti-collision light sources 42. In this operating scenario, the controller 62 is able to conveniently monitor the performance of the navigation light source 22 and the plurality of anti-collision light sources 42.

In the exemplary embodiment of FIG. 4, the navigation light sensor 30 has a field of view 32 through the lens cover 60. There is a line of sight connection between the navigation light sensor 30 and the lens cover 60. Light originating in the field of view 32 or being directed into the field of view 32 can reach the navigation light sensor 30, without any obstacles between the lens cover 60 and the navigation light sensor 30.

As pointed out above, FIG. 4 depicts a scenario where the lens cover 60 is un-eroded. In this case, almost all of the light of the navigation light output and the anti-collision light output passes through the lens cover 60 in an un-altered manner. Only a very small portion of the light is reflected in a specular manner. This is illustrated by exemplary specular reflections 70, also referred to as Fresnel reflections 70. The elements of the combined aircraft navigation and anti-collision light 2 are arranged in such a manner that no specular reflections of light, stemming originally from the anti-collision light sources 42, reach the navigation light sensor 30. Accordingly, in the case of an un-eroded lens cover 60, the anti-collision light output does not create a signal component in the first light detection signal 38.

Figure 5:
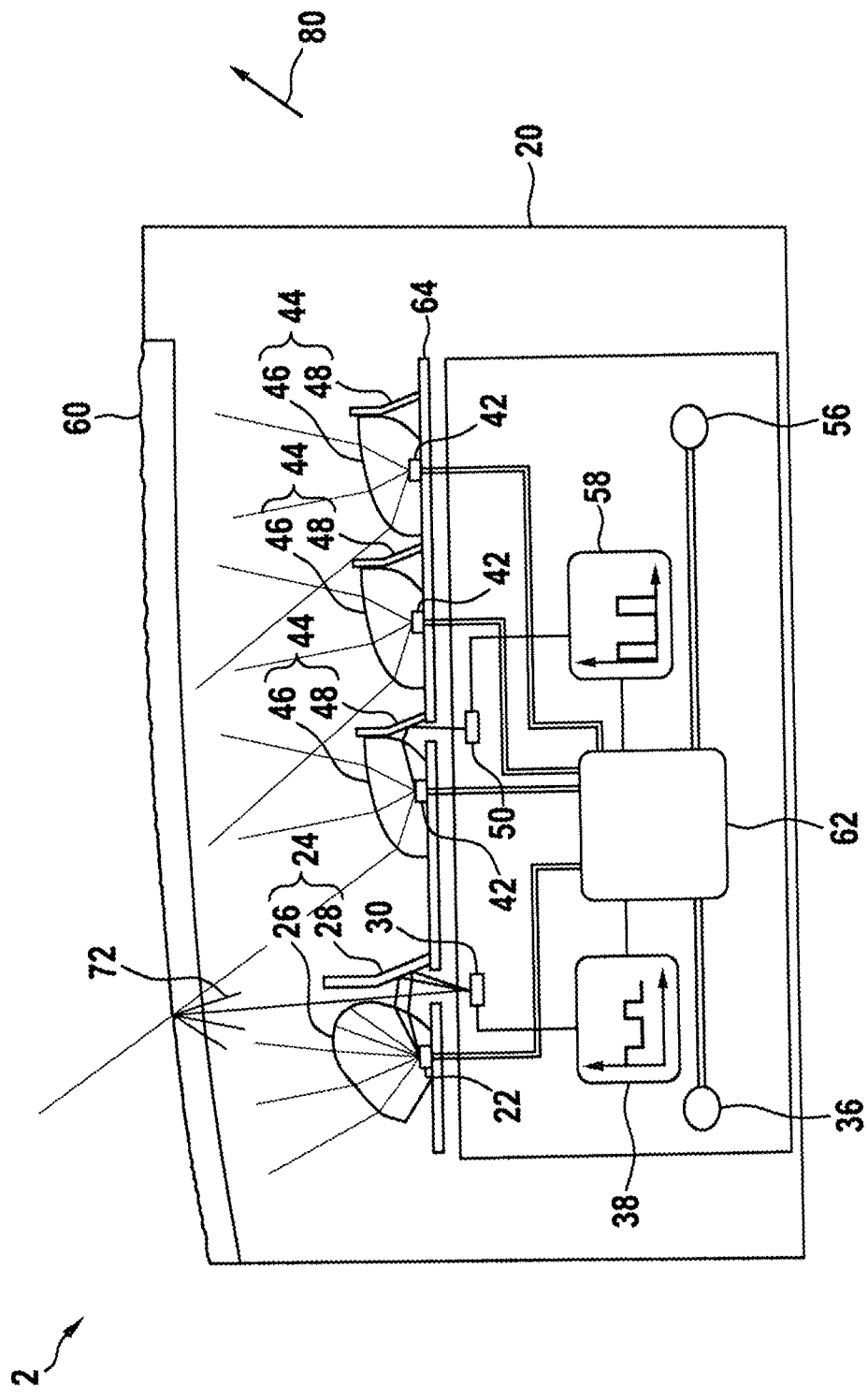
FIG. 5 shows the combined aircraft navigation and anti-collision light of FIG. 4, with the lens cover being somewhat eroded.

FIG. 5 shows the combined aircraft navigation and anti-collision light 2 of FIG. 4, with the outer surface of the lens cover 60 being somewhat eroded. The erosion of the outer surface of the lens cover 60 is illustrated by a wiggly line along the lens cover 60. The erosion of the outer surface of the lens cover 60 leads to small defects/irregularities in the lens cover 60, which give rise to diffuse reflections. This is illustrated with the help of one exemplary light ray of the anti-collision light output, part of which is diffusely reflected at the outer surface of the lens cover 60 and splits up into various light rays 72. The exemplary light rays 72, which are due to the diffuse reflection at the lens cover 60, are directed back towards the circuit board 64, with a small portion of those light rays 72 being directed towards the navigation light sensor 30. This is illustrated by an exemplary light ray 72, reaching the navigation light sensor 30 on a direct path from the spot of diffuse reflection.

The discussed diffuse reflection affects the first light detection signal 38, as output by the navigation light sensor 30 to the controller 62. In particular, in addition to the steady signal component in the first light detection signal 38, discussed above with respect to FIG. 4, a regular pulsed signal component is present in the first light detection signal 38. The pulsed signal component has a frequency corresponding to the flash frequency of the anti-collision light output. Further, with the erosion of the lens cover 60 being a slow process, subsequent pulses of the pulsed signal component have generally the same amplitude. In other words, the diffuse reflection conditions at the lens cover 60 can be considered constant from one anti-collision light flash to another.

In the exemplary embodiment of FIG. 5, the controller 62 is configured to extract the pulsed signal component from the first light detection signal 38 and to determine the amplitude of said pulsed signal component. The controller 62 is further configured to consider the amplitude of the pulsed signal component of the first light detection signal 38 as a measure for the state of erosion of the lens cover 60. In case the controller 62 determines that the amplitude of the pulsed signal component is above a pulsed amplitude threshold, the controller 62 determines a critical erosion of the lens cover 60. In a particular example, the controller 62 may flash the first NEOL indicator light 36 and the second NEOL indicator light 56 in a synchronised manner, thus outputting a signal for a critical state of erosion of the lens cover 60. The controller 62 may also communicate an according signal to another entity, such as to an on-board aircraft computer.

In the exemplary embodiment of FIG. 5, the controller 62 is inherently aware of the flash frequency of the anti-collision light sources 42 and is therefore able to extract the pulsed signal component with said frequency from the first light detection signal 38. It is also possible that the controller 62 determines the pulse frequency from the second light detection signal 58 and uses the extracted pulse frequency for analyzing the first light detection signal 38 for a pulsed signal component with the same frequency. It is further possible that the controller 62 simply extracts the most dominant pulsed signal component from the first light detection signal 38 that has a pulse frequency of between 40 and 100 pulses per minute.

It is pointed out that the much higher light intensity of the anti-collision light output, as compared to the navigation light output, and the multitude of light paths from the plurality of anti-collision light sources to the navigation light sensor 30 via diffuse reflection allow for such a significant pulsed signal component in the first light detection signal 38 that this pulsed signal component can be reliably detected.

FIG. 6 shows the combined aircraft navigation and anti-collision light 2 of FIG. 4, when flying through clouds. The clouds are schematically illustrated by a single cloud 76. For ease of illustration, FIG. 6 shows a scenario where the lens cover 60 is in a non-eroded state.

The cloud 76 gives rise to a diffuse reflection of light, stemming from the plurality of anti-collision light sources 42 and forming part of the anti-collision light output. The diffuse reflection is illustrated with respect to an exemplary light ray, stemming from one of the plurality of anti-collision light sources 42, which splits into various diffuse reflections 74. A portion of these diffuse reflections 74 reaches the navigation light sensor 30, which is illustrated by a single light ray, reaching the navigation light sensor 30 from the point of diffuse reflection in the cloud 76.

The diffuse reflections in the cloud also have an effect on the first light detection signal 38. In particular, as clouds are highly non-uniform structures and as the relative speed between the aircraft and the clouds is very high, the diffuse reflections from the clouds give rise to a varying signal component in the first light detection signal 38. In particular, this varying signal component may have pulses of different amplitudes, in particular of different peak amplitudes and/or different average amplitudes. Also, the pulses are commonly not more or less rectangular pulses, but may be pulses of irregular shapes. The varying signal component is also referred to herein as a non-regular pulsed signal component in the first light detection signal 38.

Upon detecting such a non-regular pulsed signal component, the controller 62 is configured to dim the navigation light source 22 or the plurality of anti-collision light sources 42 or all of the navigation light source 22 and the plurality of anti-collision light sources 42. In this way, the controller may reduce the diffuse reflections by the clouds and may reduce the risk of glaring the pilots in the cockpit of the aircraft by said diffuse reflections from the clouds.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. Combined aircraft navigation and anti-collision light, comprising:
   at least one navigation light source;
   a navigation light sensor, in operation outputting a light detection signal corresponding to an amount of light detected by the navigation light sensor;
   a first optical system, associated with the at least one navigation light source, wherein the first optical system is configured for shaping a navigation light output from light emitted by the at least one navigation light source and is configured for directing stray light from the at least one navigation light source to the navigation light sensor;
   at least one anti-collision light source;
   a second optical system, associated with the at least one anti-collision light source and configured for shaping an anti-collision light output from light emitted by the at least one anti-collision light source;
   a lens cover, arranged over the at least one navigation light source, the first optical system, the at least one anti-collision light source, and the second optical system for passing the navigation light output and the anti-collision light output therethrough, wherein the navigation light sensor is arranged with respect to the lens cover to detect light emitted by the at least one anti-collision light source and diffusely reflected by the lens cover;
   and
   a controller, coupled to the navigation light sensor and configured to determine a state of erosion of the lens cover from a pulsed signal component of the light detection signal.

2. The combined aircraft navigation and anti-collision light according to claim 1, wherein the navigation light sensor is arranged in line of sight to the lens cover.

3. The combined aircraft navigation and anti-collision light according to claim 1, wherein the navigation light sensor has a field of view of at least 5° opening angle through the lens cover.

4. The combined aircraft navigation and anti-collision light according to claim 3, wherein the navigation light sensor has a field of view of at least 10° opening angle through the lens cover.

5. The combined aircraft navigation and anti-collision light according to claim 4, wherein the navigation light sensor has a field of view of at least 20° opening angle through the lens cover.

6. The combined aircraft navigation and anti-collision light according to claim 1, wherein the controller is configured to determine the state of erosion of the lens cover from a pulsed signal component of the light detection signal having a pulse frequency of between 40 and 100 pulses per minute.

7. The combined aircraft navigation and anti-collision light according to claim 1, wherein the controller is configured to determine the state of erosion of the lens cover from a pulsed signal component of the light detection signal having a substantially constant pulse amplitude.

8. The combined aircraft navigation and anti-collision light according to claim 1, wherein the controller is configured to indicate a critical state of erosion of the lens cover when a pulse amplitude of the pulsed signal component exceeds a pulse amplitude threshold.

9. The combined aircraft navigation and anti-collision light according to claim 1, wherein the controller is configured to determine a state of degradation of the at least one navigation light source from a steady signal component of the light detection signal.

10. The combined aircraft navigation and anti-collision light according to claim 1, wherein the controller is configured to dim the at least one navigation light source and/or the at least one anti-collision light source in response to detecting a non-regular pulsed signal component in the light detection signal.

11. The combined aircraft navigation and anti-collision light according to claim 1, further comprising:
    an anti-collision light sensor, in operation outputting a second light detection signal corresponding to an amount of light detected by the anti-collision light sensor,
    wherein the second optical system is configured for directing stray light from the at least one anti-collision light source to the anti-collision light sensor.

12. The combined aircraft navigation and anti-collision light according to claim 11,
    wherein the controller is coupled to the anti-collision light sensor, and
    wherein the controller is configured to determine a characteristic pulse frequency or a characteristic pulse duration from the second light detection signal and wherein the controller is configured to extract said pulsed signal component from the light detection signal on the basis of the characteristic pulse frequency and/or the characteristic pulse duration.

13. The combined aircraft navigation and anti-collision light according to claim 1,
wherein the at least one navigation light source and the at least one anti-collision light source are arranged substantially on a common mounting plane, and/or
wherein the at least one navigation light source and the at least one anti-collision light source are spaced between 5 cm and 20 cm, in particular between 5 cm and 10 cm, from the lens cover.

14. An airplane comprising:
two combined aircraft navigation and anti-collision lights in accordance with claim 1, arranged in respective wing tip regions of a left wing and a right wing of the air plane.

15. A method of determining a state of erosion of a lens cover of a combined aircraft navigation and anti-collision light, having at least one navigation light source and at least one anti-collision light source, comprising:
generating a light detection signal with a navigation light sensor, the light detection signal corresponding to an amount of light detected by the navigation light sensor, wherein the navigation light sensor is arranged to detect stray light from the at least one navigation light source, directed towards the navigation light sensor by a first optical system, and wherein the navigation light sensor is arranged to detect light emitted by the at least one anti-collision light source and diffusely reflected by the lens cover; and
determining a state of erosion of the lens cover from a pulsed signal component of the light detection signal.

16. The method according to claim 15, wherein the step of determining a state of erosion of the lens cover comprises determining the state of erosion of the lens cover from a pulsed signal component of the light detection signal having a pulse frequency of between 40 and 100 pulses per minute.

17. The method according to claim 16, wherein the step of determining a state of erosion of the lens cover comprises determining the state of erosion of the lens cover from a pulsed signal component of the light detection signal having a substantially constant pulse amplitude.

18. The method according to claim 15, wherein the step of determining a state of erosion of the lens cover comprises determining the state of erosion of the lens cover from a pulsed signal component of the light detection signal having a substantially constant pulse amplitude.

* * * * *